(12) United States Patent
Perry et al.

(10) Patent No.: US 6,832,070 B1
(45) Date of Patent: Dec. 14, 2004

(54) SYSTEM AND METHOD FOR AIDING IN ANTENNA SELECTIONS

(75) Inventors: Jack Perry, Cedar Rapids, IA (US); Kenneth A. Franken, Iowa City, IA (US)

(73) Assignee: Decisionmark Corp., Cedar Rapids, IA (US)

(*) Notice: Subject to any disclaimer, the term of this patent is extended or adjusted under 35 U.S.C. 154(b) by 0 days.

(21) Appl. No.: 09/489,057

(22) Filed: Jan. 21, 2000

Related U.S. Application Data

(63) Continuation-in-part of application No. 09/092,128, filed on Jun. 5, 1998.

(51) Int. Cl.[7] .............................................. H04Q 7/20
(52) U.S. Cl. ................................... 455/3.02; 455/277.1
(58) Field of Search ............................ 455/3.01, 3.02, 455/3.06, 414.1, 423, 426.1, 452.2, 456.2, 456.6, 513, 520, 562.1, 67.11, 154.1, 277.1, 277.2, 272, 131, 12.1, 427; 725/72, 39, 109, 44, 45, 46; 348/732, 734; 709/217–219, 231, 238; 342/357

(56) References Cited

U.S. PATENT DOCUMENTS

| | | | | |
|---|---|---|---|---|
| 5,152,012 A | * | 9/1992 | Schwob | 455/158.5 |
| 5,584,050 A | * | 12/1996 | Lyons | 455/2.01 |
| 5,778,317 A | * | 7/1998 | Kaminsky | 455/450 |
| 6,018,764 A | * | 1/2000 | Field et al. | 709/217 |
| 6,052,715 A | * | 4/2000 | Fukui et al. | 725/114 |
| 6,260,192 B1 | * | 7/2001 | Rosin et al. | 725/39 |
| 6,445,688 B1 | * | 9/2002 | Garces et al. | 370/334 |
| 6,639,610 B1 | * | 10/2003 | Sponheim et al. | 345/760 |

OTHER PUBLICATIONS

TitanTV.com.*

TVGuide.com*

AntennaWeb.org.*

Printed three pages of a website on Apr. 13, 2000. The Web address was www.antennaweb.org.

* cited by examiner

*Primary Examiner*—Jean Gelin
(74) *Attorney, Agent, or Firm*—Simmons, Perrine, Albright & Ellwood, PLC

(57) ABSTRACT

A system for selecting antenna for a particular street address for terrestrially broadcast signals, where the system uses a web server to provide antenna performance characteristics for antennae recommended for use at the street address to receive the signals.

34 Claims, 5 Drawing Sheets

Results Page

*Address Located at STREET Level*
*115 3RD ST SE*
*CEDAR RAPIDS, IA 52401-1222*

| Network | Channel | Affiliate | City, State | Signal Strength (dBu) | (dBmv) | Receive? |
|---|---|---|---|---|---|---|
| ABC | 9 | KCRG | CEDAR RAPIDS, IA | 92.19 | 26.35 | ☑ |
| CBS | 2 | KGAN | CEDAR RAPIDS, IA | 79.33 | 23.91 | ☑ |
| FOX | 28 | KFXA | CEDAR RAPIDS, IA | 83.81 | 8.59 | ☑ |
| NBC | 7 | KWWL | WATERLOO, IA | 84.41 | 19.14 | ☑ |
| PAX | 48 | KPXR | CEDAR RAPIDS, IA | 90.4 | 13.48 | ☑ |
| WB | 20 | KWKB | IOWA CITY, IA | 109.17 | 34.73 | ☑ |
| PBS | 12 | KDIN | IOWA CITY, IA | 91.51 | 24.88 | ☑ |
| | 32 | KDIN | WATERLOO, IA | 102.67 | 27.07 | ☑ |

[Map It] [Continue]

FIG. 2

Address Located at STREET Level
115 3RD ST SE
CEDAR RAPIDS, IA 52401-1222

Installation Position: Roof
Housing Type: Single Story
Number of TV Sets: 1

Antenna Recommendation

| Model No. | Model Description | Antenna Direction | Excellent | Good | Poor |
|---|---|---|---|---|---|
| GS-1000 | Non-amplified Sensar Antenna | 330 | 9,20,32 | 2,7,12,48 | 28 |
| GS-2000 | Amplified Sensar Antenna | 330 | 9,20,32 | 2,7,12,28,48 | |
| PR-7005 | Prostar 40" 15 Element Antenna | 325 | 9,20,32 | 2,7,48 | 12,28 |
| PR-7015 | Prostar 88" 31 Element Antenna | 295 | 20,32 | 2,7,9,12,28,48 | |
| PR-7037 | Prostar 124" 39 Element Antenna | 300 | 20,28,32 | 2,7,9,48 | 12 |
| PR-7052 | Prostar 170" 49 Element Antenna | 325 | 2,7,9,20,32,48 | 28 | 12 |
| PR-7005A | Prostar 40" 15 Element Antenna w/Preamp | 325 | 9,20,32,48 | 2,7,12,28 | |
| PR-7015A | Prostar 88" 31 Element Antenna w/Preamp | 335 | 2,7,9,12,20,32,48 | 28 | |
| PR-7037A | Prostar 124" 39 Element Antenna w/Preamp | 340 | 2,7,9,20,32,48 | 12,28 | |
| PR-7052A | Prostar 170" 49 Element Antenna w/Preamp | 345 | 2,7,9,20,32,48 | 12,28 | |

Accessories

| Model No. | Model Description |
|---|---|
| DIY2000 | Self-install Kit for Off-air Antenna |
| SW-0005 | Tripod Roof Mount w/5ft. Mast |
| SW-0012 | Gable End Mount w/5ft. Mast |
| CM-2012 | Chimney Mount w/5ft.Mast |
| SP-1002 | 2-Way Splitter |
| SP-1004 | 4-Way Splitter |

Start

FIG. 4

SYSTEM AND METHOD FOR AIDING IN ANTENNA SELECTIONS

CROSS REFERENCE TO RELATED APPLICATION

This is a continuation-in-part application of application Ser. No. 09/092,128 filed on Jun. 5, 1998, by Jack Perry, David J. Cechota, Kenneth A. Franken, Martha S. McCurry, and Toufic T. Moubarak for "METHOD AND APPARATUS FOR LIMITING ACCESS TO SATELLITE COMMUNICATION SIGNALS", which application is incorporated herein in its entirety by this reference.

FIELD OF THE INVENTION

The present invention generally relates to antennae and more particularly relates to antennae for reception of terrestrially broadcast signals, and even more particularly relates to a system and method for aid in the selection of antennae chosen based upon a predicted reception characteristic of a terrestrially broadcast signal.

BACKGROUND OF THE INVENTION

In the past, the predominant method for consumers to receive television and radio programming was via a terrestrial broadcast, through an antenna. Over time, with increased amounts of programming, as well as generally more consistent reception quality, cable became the most common medium for delivery of television programming. More recently, satellite-delivered programming (DBS) is becoming a rapidly expanding option for many Americans. However, for a variety of regulatory and technical reasons, DBS is currently unable to pro vide local programming to many areas, thereby leaving DBS customers to receive local programming via terrestrial broadcasts. The introduction of digital television broadcasts, which may or may not be carried by cable systems, may also increase the desire for consumers to receive programming via terrestrial broadcasts. Additionally, the Federal Communications Commission (FCC) is considering greatly increasing the number of low-powered FM radio stations. This would likely further increase the need for consumers to use antennae to receive terrestrial broadcasts.

Consequently, there exists a need for improvement in systems and methods for aiding consumers in selecting antennae to receive terrestrial broadcasts.

SUMMARY OF THE INVENTION

It is an object of the present invention to assist consumers in understanding the strength of terrestrially broadcast signals at a particular address.

It is another object of the present invention to assist consumers in selecting appropriate antennae for use at a particular location.

It is yet another object of the present invention to assist consumers in proper orientation of a particular antenna to receive a particular terrestrially broadcast signal.

It is a feature of the present invention to predict, for a particular location, the signal strength of terrestrially broadcast signals.

It is an advantage of the present invention to better inform consumers on proper antennae selection and orientation.

The present invention is an apparatus and method for providing information relating to antenna selection and orientation, for a particular location or address, which is designed to satisfy the aforementioned needs, provide the previously stated objects, include the above-listed features, and achieve the already articulated advantages. The present invention is carried out in a "guess-less system" in a sense that guesswork in selecting and orienting an appropriate antenna for use at a predetermined location to receive a predetermined terrestrially broadcast signal has been greatly reduced.

Accordingly, the present invention is a system and method for providing information to help in antenna selection and orientation, which includes a geocoding apparatus and a signal strength predictor for predicting a signal strength characteristic of a terrestrially broadcast signal at a predetermined location. The invention also picks an orientation that generally optimizes the antenna's performance for a group of signals.

BRIEF DESCRIPTION OF THE DRAWINGS

The invention may be more fully understood by reading the following description of the preferred embodiments of the invention, in conjunction with the appended drawings wherein:

FIG. 2 is a representation of a web page as viewed by a browser, which shows a list of terrestrially broadcast signals, together with their predicted signal strengths, for a particular location entered in the address entry mechanism of FIG. 1.

FIG. 4 is a representation of a web page as viewed by a browser, which shows a list of antennae, together with the direction of orientation and a grading of performance from the particular location entered in the address entry mechanism of FIG. 1.

DETAILED DESCRIPTION

Figure 1:
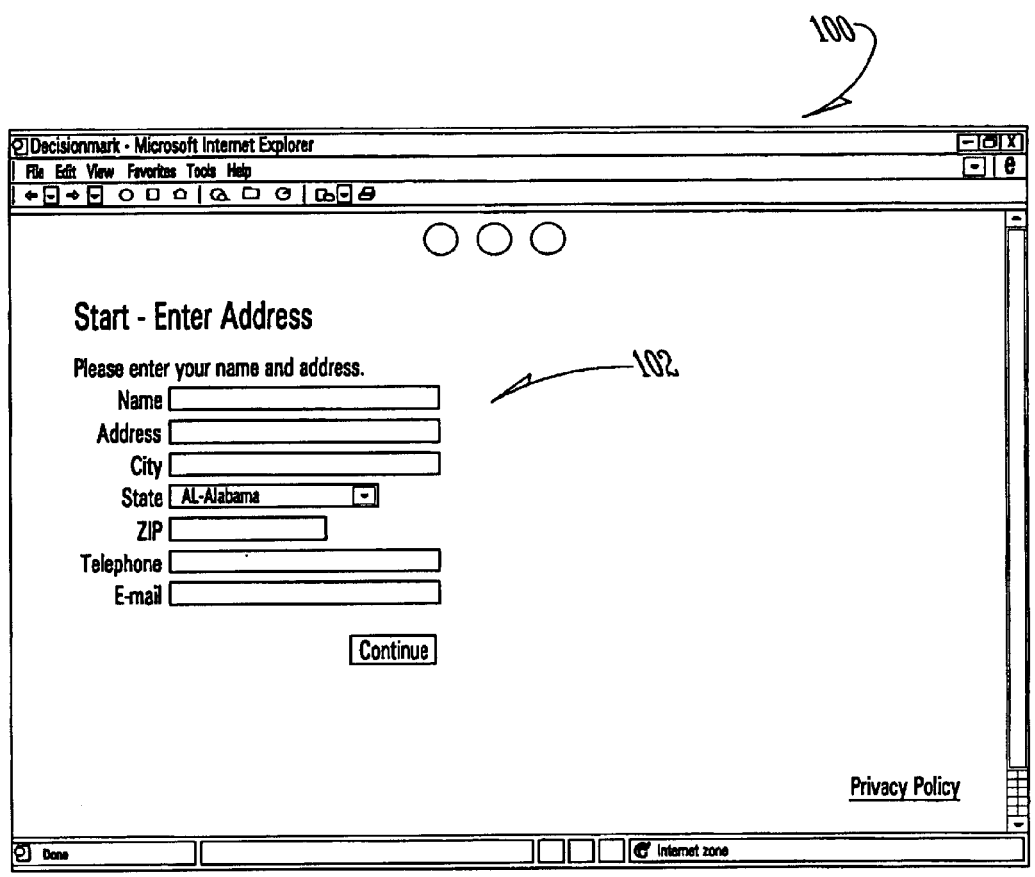
FIG. 1 is a representation of a web page as viewed by a browser, which shows an address or location entry mechanism.

Now referring to the drawings wherein like numerals refer to like matter throughout, and more particularly to FIG. 1, there is shown a representative web page of the present invention, generally designated 100, having an address data entry field 102 therein for entering a street address of a predetermined location, for which signal strength magnitude and directional characteristics of terrestrially broadcast signals are desired. For the following discussion, 115 Third Street SE, Cedar Rapids, Iowa 52401, is used as an address in address data entry field 102. In the alternative, a postal zip code, Lat/Lon or other geographic reference could be used as an input.

Now referring to FIG. 2, there is shown a results web page of the present invention, generally designated 200, having a list of terrestrially broadcast television stations, which serve the area entered in address data entry field 102. Television stations are shown as an example of the various types of terrestrial broadcast signals which could be examined by the present invention, such as FM radio, AM radio, Digital Television, etc. Results web page 200 includes columns relating to the following information with respect to the terrestrially broadcast signals: 202 is a network field column, 204 is the channel number column, 206 is the affiliate name column, 208 is the city, state of the affiliate, and 210 is the signal strength column in dBu. The column 211 allows a user to specify channels of interest. Also shown is a link to a map of the location of the terrestrial signal sources with respect to the address entered in address data entry field 102. Also shown is map link 220 and antenna recommendation link 222, which serve as easy links to information, such as shown on FIG. 3 and FIG. 4 respectively.

Figure 3:
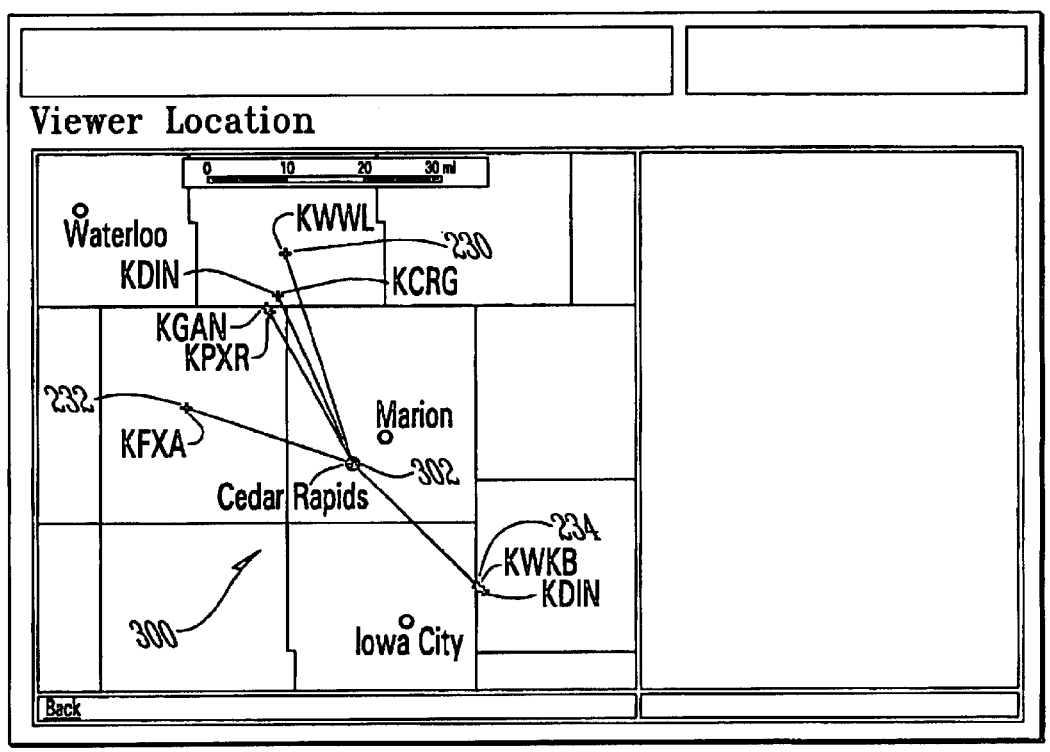
FIG. 3 is a representation of a web page as viewed by a browser, which shows a map of locations of transmitters of terrestrially broadcast signals in relation to the particular location entered in the address entry mechanism of FIG. 1.

Now referring to FIG. 3, there is shown a geographical map representation of the address entered in address data entry field 102 with respect to the various nearby sources of terrestrially broadcast signals. The map, generally designated 300, has a central location 302, which corresponds to the address entered in address data entry field 102. Various sources of terrestrial broadcast signals are shown on map 300, including the KWWL transmitter 230, the KFXA transmitter 232, and the KWKB transmitter 234. Other stations are shown, but not enumerated herein. Lines are drawn radially from central location 302 to the various transmitters. These lines may be color coded, or may have other visual techniques, such as shading, dots, dashes etc., to intuitively convey signal strength information, and/or antenna performance information.

Now referring to FIG. 4, there is shown an antenna recommendation web page of the present invention, generally designated 400, including a model column 402, which includes a model number and hypertext link to more information about a particular antenna model. A description of the antenna is given in column 404. The present invention determines the best orientation of a particular antenna to optimize reception across the group of stations chosen by the user. The antenna direction column 406 includes a direction, specified in degrees, with North being at 0 and 360 degrees. Also shown are columns 408, 410, and 412, which categorize the reception on a channel-by-channel basis as excellent, good, and poor respectively.

Figure 5:
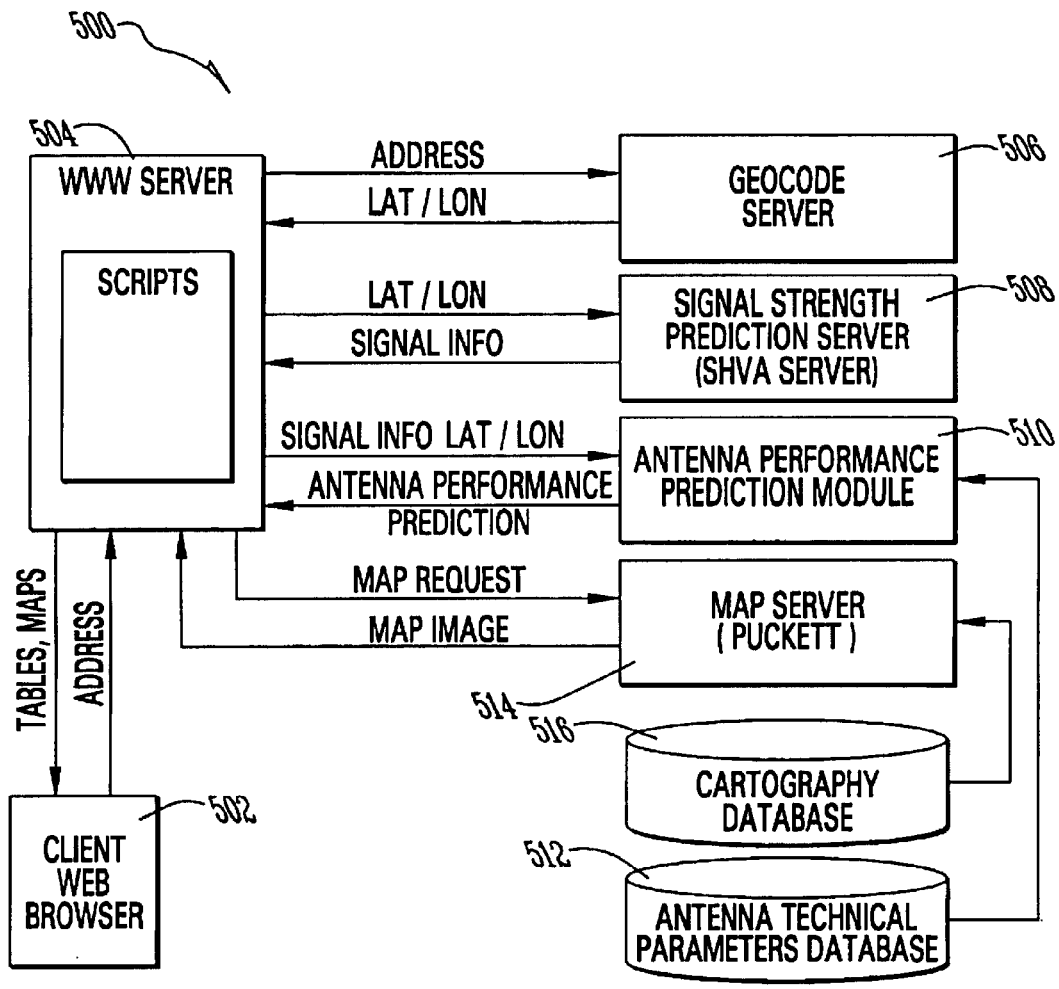
FIG. 5 is a block diagram of the major functional components of a system of the present invention.

Now referring to FIG. 5, there is shown a system of the present invention generally designated 500, which provides for widely distributed processing capability, which includes at least one client web browser 502 disposed at a first location and on a first computer. This computer may be a typical IBM compatible computer operating on a Windows environment or any other computer capable of operating a Web browser or subsets of a Web browser. The client Web browser 502 is coupled via the internet or any other computer network using Transmission Control Protocol/Internet Protocol (TCP/IP) formatted text to a Web server 504 located at a second location distant from said first location. Typically, browsers communicate with WWW servers using the Hyper Text Transfer Protocol (HTTP). HTTP typically, though not exclusively, uses TCP/IP as the transport mechanism. In a well-known manner, client web browser 502 provides street address information to Web server 504, which responds with various forms of information, including tables, maps, etc. Web server 504 is also coupled, via Remote Procedure Call (RPC), with a geocode server 506, which receives street addresses from web server 504 and provides a corresponding latitude and longitude coordinate (Lat/Lon). The geocode server would be skipped if Lat/Lon were entered directly. Also coupled to web server 504, via a TCP/IP connection, is a signal strength prediction server 508 (SHVA server) which receives Lat/Lon from the Web server 504 and generates information relating to a signal strength characteristic predicted for that particular Lat/Lon for a particular signal source.

One implementation uses Longley-Rice to predict signal strength at a location. It may be preferred to build systems for signal strength prediction that use a point-in-polygon approach to estimate signal strength using polygons within which the signal strength is relatively constant.

The point-in-polygon approach may generate inferior signal strength predictions, but it can be done using commercially available GIS servers. (QMS sells a "spatial+" point-in-polygon server that could be adapted to give approximate signal strengths.)

Also, it is straightforward to replace the Longley-Rice predictions with another signal strength prediction methodology, such as FCC signal strength curves used to generate predicted signal strengths.

Next, an antenna performance prediction module 510 receives, via COM, the predicted signal strength information for the particular Lat/Lon and generates an antenna performance prediction which is based in part upon information received from the antenna technical parameters database 512. Antenna performance prediction module 510 operates as follows: The predicted signal strengths are converted to predicted voltage at the receiver for an ideal antenna by applying corrections for line loss, antenna dipole factor, splitter loss, antenna height and antenna placement (outside vs. inside); this conversion is well known in the art. For each antenna, the predicted voltage for each channel of interest at a given antenna orientation is modified by applying further corrections for the gain of the antenna on that channel, the gain of any amplifiers/pre-amplifiers present and the polar pattern of the antenna for that channel and the angle to the transmitter; this information is obtained from the antenna technical parameters database 512. Thus modified, the predicted voltage is used to predict antenna performance for that orientation using an empirical formula derived from relating predicted voltages to measured picture quality. This process is repeated for a number of orientations, giving a set of orientations and associated predicted picture qualities for a number of transmitters. The orientation that maximizes the number of transmitters for which predicted picture quality is "good" is chosen as the recommended orientation and the predicted picture quality for each channel at that orientation is reported back to the Web server 504. If a map is requested by the client web browser via XML over DCOM, map server 514, with the aid of cartography database 516, can generate a map image relating to the particular street address. XML is an acronym for extensible Markup Language. DCOM is an acronym for distributed component object module. Servers 506, 508, 510, and 514, as well as databases 512 and 516, may be collocated on a single server and may be combined with web server 504. The inter-component communications mechanisms (COM, DCOM, etc.) could easily be changed.

Web server 504, located at a second location, operates on industry standard Web server software, such as Microsoft Internet Information Server (IIS) Version 3.0 or later. Web server 504 hosts several Active Server Pages (ASPs) which contain scripts of actions to perform and programmatic steps to generate Hyper Text Markup Language (HTML) to be provided back to client Web browser 502. Web server 504 provides a novel mechanism for producing complex interaction without requiring sophisticated browser technology, such as client side Java Applets or dynamic HTML (DHTML) on client Web browser 502. Active Server Pages may, but need not contain embedded therein scripts such as Visual Basic script (VB script) or Microsoft's dialect of JavaScript. The ASP may be able to use any standard component that runs with an NT server environment, such as Microsoft-defined interfacing standard Component Object Model (COM). This enables designers to very early tailor the present invention to meet particular user requirements.

All that a designer need do is customize the ASP without the need for other changes to result in a customized interface with client Web browser 502. Equivalent scripting environments are available on other www servers; e.g. Java Server Pages (JSP) on Apache www server. The same functionality could be obtained using CGI (Commercial Gateway Interface) programs on nearly any www server.

Coupled to Web server 504 is geocode server 506, which may be a separate process providing geocoding services. This geocode server may be any commercially available geocoder, such as geocoders provided by QMS, Group 1 and MatchWare, all of which are known in the art, or in other implementation. In a preferred embodiment, the geocode server 506 might be configured such that a "wrapping" or geocoding interface is interposed between the commercially available geocoders (QMS, Group 1, MatchWare, etc.) so as to provide a uniform interface with the remainder of system 500. However, it is believed that in some instances, it may be preferable to operate servers 504 and 506 on independent computers. Web server 504 is shown coupled to map server 514, which is coupled to a cartographic database 516, which may be standard Structured Query Language (SQL) database, which contains cartographic data and data specific to a particular implementation of the present invention. The cartographic database 516 may contain background cartography, such as state and county boundaries, interstate highways, and coastal water.

In one embodiment of the present invention, SHVA server 508 would also contain and manipulate information about specific television stations, including their DMA, call sign, network affiliation, etc. A designer may choose to use well-known devices, such Longley-Rice signal strength calculators.

All of these databases are preferably SQL databases that the Web server 504 accesses, using standard Open Database Connectivity (ODBC) drivers. The present invention need not specify any particular database or database server platform; a candidate database need only provide an ODBC driver and be capable of storing SQL Binary Logic Objects (BLOBs). The preferred embodiment of the present invention uses Microsoft SQL servers running on an independent machine from the Web server 504. With some effort, the invention could be adapted to use non-ODBC compliant databases.

Web server 504, in combination with map server 514 may generate a geographical map upon a request from a client operating client Web browser 502. The map representation may be in any industry standard graphics format, such as JPEG, PNG, GIF, or any suitable format.

The present invention may be more fully understood by reviewing its operation. In operation, the present invention performs as follows:

A user inputs a URL for a particular ASP of the Web server 504 into client Web browser 502. Web server 504 contains the active server page and generates and delivers a page with HTML to client Web browser 502. The user enters a street address into client Web browser 502 and transmits the same to Web server 504 which, with the aid of geocode server 506, accesses a database and develops a latitude -and longitude reference for the street address and provides the same back to Web server 504.

In a second phase, the active server page emits an HTML table page that describes the relevant stations. This table may contain HTML code for hyperlinks that a client or user operating client Web browser 502 may select to view a map or other antenna related information.

In a third phase, the user of client Web browser 502 selects a hyperlink for a map which is transmitted back to Web server 504, which submits a request to the map server 514 to emit a map in a browser supported graphics format, such as PNG or JPEG. The map server 514 creates a multi-layer map using a Puckett cartographic object library. The map server 514 uses the standard Puckett map rendering component to draw the map and uses a standard cartographic object library as it draws. Instead of the Puckett system, an alternate could easily be used, such as a commercially available map server; e.g. Map Objects by ESRI.

In a fourth phase, antenna performance predictions are made, using the antenna technical parameters database 512.

Consequently, a user of client Web browser 502 is able to determine a signal strength characteristic of a particular television station and determine a suitable antenna for use at a known street address through the use of the invention 500. In general, the user of client Web browser 502 may be given information relating to the appropriateness of a particular antenna. The user of client Web browser 502 may desire additional information relating to the listed antennae and may request via client Web browser 502 that additional information about each antenna be provided. It should also be understood that the client need not be a browser; it could be integrated into a "back office" application. Additionally, it should be understood that inter-component communication protocols, such as DCOM, TCP/IP, etc., are well known, and numerous known protocols could be used interchangeably.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. A system aiding in a selection of an antenna for a particular geographic location, the system comprising:
   a web browser at a first location, for interaction with a user;
   a web server at a second location for receiving information from said user via said web browser;
   said web server receiving a latitude and a longitude coordinate;
   said web server coupled to a signal strength server, which predicts a signal strength of a terrestrially broadcast signal at said latitude and longitude coordinate; and,
   said web server coupled to an antenna performance prediction module, which predicts performance characteristics of predetermined antennae when used at said geographic location.

2. A system of claim 1 further comprising a map server coupled to said web server for generating a map of a region around said geographic location, including a radial line extending from said geographic location toward a transmission point of said terrestrially broadcast signal.

3. A system of claim 1 wherein said signal strength server uses a Longley-Rice model to predict signal strengths.

4. A system of claim 2 wherein said map server uses a Puckett cartographic object library.

5. A system of claim 1 further including a geocode server, for converting a address to a Lat/Lon, internally coupled to said web server, which web server is a single multipurpose server.

6. A system of claim 5 wherein said geocode server, said signal strength server, said antenna performance prediction module and said map server are all internally coupled with said web server, which said web server is a single multi-purpose server.

7. A system of claim 1 wherein said signal strength server communicates with said web server with text formatted in a TCP/IP format.

8. A system of claim 1 further including a geocode server for converting a street address into a Lat/Lon, wherein said geocode server communicates with said web server via RPC.

9. A system of claim 8 which substitutes XML over HTTP connectors instead of RPC.

10. A systems of claim 1 wherein said web server receives said latitude and longitude coordinate from a user input.

11. A systems of claim 1 wherein said strength server uses a T/REM model.

12. A method of selecting an antenna comprising the steps of:
providing a geographic location to a web browser, at a first location;
communicating said geographic location to a server over an internet connection between said browser and said server, said server located at a point distant from said first location;
predicting a signal strength, at said geographic location, of a terrestrially broadcast signal;
predicting an antenna performance characteristic of an antenna when said antenna is used at said geographic location to receive said terrestrially broadcast signal, and generating an antenna performance report value in response to said predicting an antenna performance characteristic; and,
providing said antenna performance report value to said web browser via said internet connection.

13. A method of claim 12 further comprising the step of generating a map showing a relationship between said geographic location and a transmission point of said terrestrially broadcast signal.

14. A method of claim 12 wherein a Longley-Rice model is used to predict signal strengths.

15. A method of claim 13 wherein a Puckett cartographic library is used in generating said map.

16. A method of claim of claim 15 comprising a step of calculating a latitude and longitude done with a geocode server communicating with a remote procedure call.

17. A method of claim 12 further comprising the steps of:
calculating a latitude and longitude coordinate which corresponds to a street address.

18. A method of claim 12 wherein said geographic location is a street address.

19. A method of claim 12 wherein said geographic location is a user input of a Lat/Lon.

20. A method of selecting an antenna comprising the steps of:
inputting a street address into a web browser;
providing an identification of a terrestrially broadcast signal to said web browser;
providing to said web browser an identification of a particular antenna having a predetermined characteristic with respect to a signal strength characteristic of said terrestrially broadcast signal at said street address; and,
wherein said particular antenna is primarily configured for reception of terrestrially broadcast signals.

21. A method of selecting an antenna comprising the steps of:
inputting a geographic location into a web browser;
providing to said web browser a list of terrestrially broadcast signals having a predetermined relationship with said geographic location;
providing to said web browser a list of antennae characteristics, having a predetermined relationship with respect to said geographic location and said list of terrestrially broadcast signals; and,
wherein said list of antenna characteristics are for antennae which are primarily related to reception of terrestrial broadcast signals.

22. A method of claim is 21 wherein said list of terrestrially broadcast signals includes information relating to channel numbers of a plurality of television signals included in said list.

23. A method of claim 22 wherein said list includes a signal strength characteristic for one of said plurality of television signals.

24. A method of claim 21 wherein said geographic location is a street address.

25. A method of selecting an antenna comprising the steps of:
inputting a geographic location into a web browser;
providing to said web browser a list of terrestrially broadcast signals having a predetermined relationship with said geographic location;
providing to said web browser a list of antennae characteristics, having a predetermined relationship with respect to said geographic location and said list of terrestrially broadcast signals;
wherein said list of terrestrially broadcast signals includes information relating to channel numbers of a plurality of television signals included in said list;
wherein said list includes a signal strength characteristic for one of said plurality of television signals; and,
a map showing a relationship between said geographic location and transmission locations of said plurality of television signals.

26. A method of claim 25 wherein said map includes a plurality of lines extending radially from said geographic location toward said transmission locations.

27. A method of claim 26 wherein said plurality of lines has visually distinct characteristics as a function of a predetermined signal strength related characteristic.

28. A method of claim 27 wherein said predetermined signal strength related characteristic is a characteristic including antenna performance characteristics of a particular antenna.

29. A system for antenna selection comprising:
means for providing a geographic reference corresponding to a predetermined receiving location;
means for converting said geographic reference into a predicted signal strength for a plurality of terrestrial broadcast signals incident upon said predetermined receiving location;
means for reporting information relating to an antenna, as a function of said predicted signal strength and predetermined antenna characteristics; and
wherein said means for converting does not include a radio receiver configured to receive any of said plurality of terrestrial broadcast signals.

30. A system of claim 29 wherein said geographic reference is a street address.

31. A system of claim 29 wherein said geopraphic reference is a user input Lat/Lon a reference.

32. A system for antenna selection further comprising:

means for providing a geographic reference corresponding to a predetermined receiving location;

means for converting said geographic reference into a predicted signal strength for a plurality of terrestrial broadcast signals incident upon said predetermined receiving location;

means for reporting information relating to an antenna, as a function of said predicted signal strength and predetermined antenna characteristics; and means for providing a map showing relationships between said geographic reference and said plurality of terrestrially broadcast signals.

33. A system of claim 32 wherein said map includes a color coded feature for communicating differences in signal strength characteristics of said plurality of terrestrially broadcast signals.

34. A system for providing information relating to antennae comprising;

a first computer, at a first location, operating a web browser, and communicating a street address over an internet connection;

a web server coupled to said first computer, via said internet connection, said web server in communication with a plurality of modules;

said plurality of modules including:

a geocode module for converting said street address into a latitude and longitude coordinate, said geocode module communicating with said web server via remote program call;

a signal strength prediction module using a Longley-Rice model, for predicting signals strengths at said latitude and longitude coordinate, said signal strength prediction module communicating with TCP/IP formatted text;

an antenna performance prediction module using a COM communication scheme and further using a database of antenna technical parameters, and using predicted signal strengths, to predict performance of an antenna used at said street address; and, a map module, using XML to communicate over DCOM, to provide a map of color coded radial lines extending from said street address to transmission points of a plurality of signal sources.

* * * * *

UNITED STATES PATENT AND TRADEMARK OFFICE
CERTIFICATE OF CORRECTION

PATENT NO. : 6,832,070 B1
DATED : December 14, 2004
INVENTOR(S) : Jack Perry et al.

It is certified that error appears in the above-identified patent and that said Letters Patent is hereby corrected as shown below:

Column 1,
Line 34, please delete "pro vide" and insert therefor -- provide --.

Column 5,
Line 59, please delete the "-" after the word "latitude".

Column 7,
Lines 15 and 17, please delete the word "systems" and insert therefor -- system --.
Line 45, please delete the first instance of the words "of claim"; and in the same line, after the number "15", please insert the word -- further --.

Column 9,
Line 2, after the words "Lat/Lon", please delete the word "a".
Line 21, after the word "comprising", please delete the ";" and insert therefor -- : --.

Signed and Sealed this

Twenty-second Day of March, 2005

JON W. DUDAS
*Director of the United States Patent and Trademark Office*